United States Patent [19]
Hauber

[11] 4,033,918
[45] July 5, 1977

[54] WATER REMOVABLE PRESSURE SENSITIVE ADHESIVE

[75] Inventor: Rüdiger Hauber, Hamburg, Germany

[73] Assignee: Beiersdorf Aktiengesellschaft, Hamburg, Germany

[22] Filed: Nov. 17, 1975

[21] Appl. No.: 632,624

Related U.S. Application Data

[63] Continuation of Ser. No. 344,309, March 23, 1973, abandoned.

[30] Foreign Application Priority Data

Mar. 24, 1972 Germany .......................... 2214293
July 26, 1972 Germany .......................... 2236575

[52] U.S. Cl. .............. 260/29.6 WB; 260/29.6 RW; 260/29.6 ME; 260/31.8 M; 260/901; 428/449; 428/514; 428/522
[51] Int. Cl.² .................. C08L 33/08; C08L 33/02; C08L 33/10
[58] Field of Search .......... 260/29.6 RW, 29.6 WB, 260/31.8 M, 901; 156/332

[56] References Cited

UNITED STATES PATENTS

| | | | |
|---|---|---|---|
| 2,677,672 | 5/1954 | Luce | 260/29.6 RW |
| 2,894,932 | 7/1959 | Bäder et al. | 156/332 X |
| 2,998,400 | 8/1960 | French | 260/29.6 RW |
| 3,657,396 | 4/1972 | Kuramoto et al. | 260/901 |
| 3,806,484 | 4/1974 | Dargan | 260/29.6 RW |

FOREIGN PATENTS OR APPLICATIONS 2,051,688  6/1971  Germany

Primary Examiner—Howard E. Schain
Assistant Examiner—W. C. Danison, Jr.
Attorney, Agent, or Firm—Bierman & Bierman

[57] ABSTRACT

The composition comprises an aqueous mixture of an acrylic acid ester copolymer and/or a polyvinyl ether; polyvinyl methyl ether; an alkali metal and/or ammonium salt of polyacrylic acid, of polymethacrylic acid or of copolymer of acrylic and methacrylic acids; a monomeric plasticizer; and an emulsifier. The composition is useful as a pressure sensitive adhesive for labels. A label coated with the composition is readily removed from the surface upon which it is affixed by treatment with water.

7 Claims, No Drawings

WATER REMOVABLE PRESSURE SENSITIVE ADHESIVE

This application is a Rule 60 Continuation of parent application Ser. No. 344,309 filed on Mar. 23, 1973, now abandoned, and claims the priority of German Application No. P22 14 293.4 filed Mar. 24, 1972 and German Application No. P22 36 575.9 filed July 26, 1972.

This invention relates to adhesive compositions. In particular, the invention relates to pressure sensitive adhesive compositions which may be applied as aqueous pastes, have good quick stick characteristics to provide prolonged adherence at room temperature, are resistant to cold flow, have good resistance to aging, and are suitable in particular for use in the manufacture of self-adhesive labels which adhere well to the most varied materials but which can easily be removed therefrom with water.

Articles of glass, porcelain, metal and plastics material, coated or uncoated, are often provided in warehouses with characterising labels which adhere so well that they can be removed from the article only with great difficulty. When the label is removed from the article to which it is adhered, often residues of adhesive remain on the article, or the label itself tears leaving part thereof on the article; thus necessitating cleaning of the article. Furthermore when such labels are removed there is a danger that part of the substrate may adhere to the label removed. This is particularly the case if the substrate consists of a sensitive and flaky material.

Also, there is wide use of self-adhesive identifying labels which adhere to articles of many types of materials or of a single type of material much less strongly than the labels described above. These labels are provided in order that they can be readily removed without a residue. This form of label is particularly used in warehouses and self-service stores using labelling devices; the device is used to stick for example labels having a price impression to the article in question. In order to prevent a purchaser with intent to defraud from exchanging a price label on an expensive article with one on a less expensive article, such labels (which are conventionally coated with a water soluble self-adhesive material) are usually provided with special cutting lines in the form of an interrupted wavy line or the like or provided with weakening lines or zones. These lines or zones cause the label to be torn if an attempt is made to remove it. However to form cutting, stamping or weakening lines or zones in each individual label on a label strip, substantial additional manufacturing steps are required.

In prior pressure sensitive adhesive marking labels there has been great difficulty in providing both good adhesion to articles of various types of material (i.e., broad usability) and also easy subsequent removal.

The present invention provides an adhesive composition which will enable pressure sensitive indentification labels to be made which have good long term adherence characteristics on articles of various materials. Further such labels tend, when the labels are removed from the article carrying them, to tear, notwithstanding that they have no cutting, weakening lines or the like. However, such labels may be easily removed from the carrying article without tearing or leaving a residue by treating the labels with water or a washing solution after a short softening time.

It has now been found that this advantageous combination of properties can be obtained if label paper or other sheet materials, e.g. cloth, plastics, foils, non-woven fabrics or the like are coated with a water soluble pressure sensitive adhesive of a particular composition.

According to the present invention there is provided an adhesive composition which comprises an aqueous mixture of a. acrylic acid ester copolymer and/or polyvinylether in dispersed form;

b. polyvinylmethylether;

c. an alkali metal and/or ammonium salt of polyacrylic acid, of polymethacrylic acid or of a copolymer of acrylic and methacrylic acids;

d. a monomeric plasticizer and e. an emulsifying agent.

The present compositions are generally prepared by mixing an aqueous dispersion of component (a) with components (b) to (e).

The proportions of the components forming the mixture can be varied within a wide range, which can readily be determined by straightforward tests. The components should be chosen such that the adhesive does not penetrate the envisaged carrier material and which, after drying, gives a layer of good adhesive power and good dispersability.

Even though in particular cases a single acrylic acid copolymer can be used in the mixture, it has nonetheless been shown that in most practical embodiments of the invention, particularly for adhesives for use in the manufacture of labels, it is better to use two acrylic acid ester copolymers having differing properties; one consisting of an uncross-linked acrylic acid ester copolymer and the other of a corresponding copolymer cross-linked by zinc acetate.

Preferably, the mixture contains, for each 100 parts by weight of total solids in the mixture:

25 to 35 parts by weight of cross-linked acrylic acid ester copolymer, 10 to 20 parts by weight of uncross-linked acrylic acid ester copolymer, 10 to 20 parts by weight polyvinylmethylether, 10 to 20 parts by weight alkali metal and/or ammonium salt of polyacrylic acid, polymethacrylic acid or a copolymer of acrylic and methacrylic acids, 10 to 20 parts by weight monomeric plasticizer and 10 to 15 parts by weight emulsifying agent.

In this preferred embodiment the total quantity of acrylic acid ester copolymer components should preferably amount to 35 to 55 parts by weight based on 100 parts by weight of total solids in the total mixture.

In the adhesive composition of the invention, the weaker adhering cross-linked acrylic acid ester copolymer serves as a framework to give the adhesive good sheer strength (i.e., acts as a sheer resisting component), and the uncross-linked acrylic acid ester copolymer, which is as such a good pressure sensitive adhesive, gives the adhesive good quick stick and strong long term adhesion characteristics towards articles of various types (i.e. acts as the strongly adherent component).

Preferably, the acrylic acid ester copolymers present in dispersed form, consist of copolymers manufactured by polymerization of large proportions of 2-ethylhexylacrylate or butylacrylate with small proportions of acrylic acid, methacrylic acid, acrylonitrile, vinyl acetate, 2-ethylhexyl maleinate and/or diethyl maleinate. Particularly advantageous are copolymers of substantial proportions of 2-ethylhexylacrylate or butylacrylate with smaller proportions of acrylic acid in uncrosslinked form in combination with the same copolymer in cross-linked form with zinc acetate. Generally, particular copolymers having pressure sensitive adhesive properties comprise 80 to 90% by weight acrylic acid ester containing 4 to 12 carbon atoms in the alcohol residue and 10 to 20% by weight acrylic acid, methacrylic acid, acrylonitrile, vinyl acetate, 2-ethylhexyl maleinate and/or diethyl maleinate. The acrylic acid ester copolymers, useable in the invention, are known products obtainable in commerce or can be readily manufactured according to known polymerization processes.

As polyvinyl ethers, which can replace all or part of the acrylic acid ester copolymer in component (a), water insoluble polymers of vinylisobutyl ether and/or vinylethyl ether have been shown to be particularly suitable. These components are generally used in the form of aqueous dispersions obtainable in commerce in various viscosity grades and having solids content of about 50 to 55%. Alternatively the dispersions can be readily manufactured by known polymerization processes. These polyvinyl ether dispersions of water insoluble polyvinyl ether are essentially different from the water soluble polyvinylmethyl ether also present in the adhesive composition.

Preferred as salts of polyacrylic acid, polymethacrylic acid or a copolymer of acrylic and methacrylic acids, which are all water soluble and which can serve as a framework-providing substance in the adhesive composition, are the sodium ammonium salt of a copolymer of acrylic and methacrylic acid (e.g., the commercial product "Silkoplex 1" of Rohm GmbH, Darmstadt) and the sodium ammonium salt of polyacrylic acid. As well as these the sodium, potassium or ammonium salts of the noted polymers and copolymers can also be used.

Suitable as polyvinylmethyl ether for the adhesives according to the invention are water soluble compounds of consistency similar to soft resins, particularly those with a K value of about 40 (e.g., the commercial product "Lutonal M 40" of BASF). The polyvinylmethyl ether acts, in the adhesive composition as a tackifier and softener.

As monomeric plasticizer (d), liquid plasticizers of oily consistency are suitable, particularly those based on a phthalate (e.g, dioctyl phthalate, dimethylglycolphthalate).

The emulsifying agent (e) added to the novel adhesive composition serves for redispersing the acrylic acid ester copolymer and/or polyvinyl ether dispersions. Further it causes a pressure sensitive adhesive layer applied to a carrier using the composition to dissolve partially in water and to swell partially and then dissolve colloidally. Particularly suitable for this purpose are non-ionic emulsifiers and stabilizing agents such as fatty acid esters of polyhydric alcohols, ethoxylated phenols, polyvinyl alcohols and above all aromatic polyglycol ethers.

The present invention also provides a method of preparing pressure-sensitive adhesive material which method comprises coating sheet material with a novel composition (after dilution if required) and drying the coating.

As a further embodiment, the invention also provides pressure-sensitive adhesive sheet material wherein the sheet material is coated with a mixture of a. acrylic acid ester copolymer and/or polyvinylether;
b. polyvinylmethyl ether;
c. an alkali metal and/or ammonium salt of polyacrylic acid, of polymethacrylic acid or of a copolymer of acrylic and methacrylic acids,
d. a monomeric plasticizer and
e. an emulsifying agent.

The utility of the pressure-sensitive adhesive compositions according to the invention is not restricted to the manufacture of conventional labels. For example, labels or adhesive tapes can be made which consists of water-soluble paper, a water-soluble foil or a water-soluble non-woven fabric coated with the pressure sensitive adhesive composition. To avoid penetration of the carrier material however, it is usually necessary in this case to provide the material, before coating with the pressure sensitive adhesive composition, with a water-soluble pre-coat (base layer) of polyvinyl alcohol and/or ethoxylated polyvinyl alcohol. The present compositions may also conveniently be used to coat strips of paper (e.g., crepe paper) which are particularly used in packaging and transporting of sanitary ware (basins, baths etc.) to minimize damage.

The following Examples further illustrate the present invention.

|  | Example 1 parts by weight (solids) | Example 2 parts by weight (solids) |
| --- | --- | --- |
| Acrylate dispersion (copolymer of acrylic acid butyl ester and acrylic acid, cross-linked with zinc acetate) (viscosity of about 50% aqueous dispersion at 25° C:1.1 poise) | 30 | 30 |
| Acrylate dispersion (copolymer of butylacrylate and acrylic acid) (viscosity of about 50% aqueous dispersion at 25° C:1.1 poise) | 20 | 10 |
| Polyvinylmethylether (K value about 40) ("Lutonal M 40", BASF) | 20 | 15 |
| Sodium ammonium salt of a copolymer of acrylic and methacrylic acids ("Silkoplex 1", Rohm GmbH) | 10 | 20 |
| Monomeric plasticizer (dioctylphthalate) | 10 | 15 |
| Non-ionic emulsifying agent (aromatic polyglycolether) ("Emulvin-W", Bayer) | 10 | 10 |

The individual components were mixed together without difficulty in any desired order in a suitable stirring vessel using a stirrer with slow stirring. The stirring in of the emulsifying agent is preferably carried out with care and particularly slowly in order to avoid foam formation and air inclusion.

The pasty pressure-sensitive adhesive composition obtained, which can be adjusted by suitable dilution with water to a concentration (total solids content) of about 40 to 60%, is used for the manufacture of labels using customary coating apparatus, e.g., by roller coating in combination with a doctor blade or by bar coating. The composition is applied such that, after drying at 100° to 150° C in a step-wise heating drying channel, the label paper carries a coating of about 20 to 50 grams/m$^2$. At the end of the drying channel the dried pressure-sensitive adhesive layer is coated with siliconized release paper.

According to another process, the adhesive composition is applied to siliconized parchment paper (release paper) at the same coating thickness and at the end of the drying channel the label paper is laminated on to the adhesive layer (transfer process). The so obtained label base material can then be cut up in conventional manner in a stamping station by two subsequently arranged separate stamping devices, in the longitudinal and cross-directions, to form individual labels in known manner. In each case the paper sheet and the underlying adherent layer are cut through, but the siliconized release paper is not cut through. The latter serves as a carrier (cover) for the pressure-sensitive adhesive labels which are initially adherent thereto and remain so until use.

The so manufactured pressure-sensitive adhesive labels show good quick stick properties, adhere well to articles of glass, porcelain, wood, metal, various plastics, card and the like. Further the label material splits when attempt is made to remove the labels from the article. This hinders exchange of labels for purposes of fraud and is accomplished without the need for a special treatment step, e.g. cutting, stamping or application of weakening lines or zones or the like. Moreover, the new labels can easily be removed without leaving any residue by treatment with water or a washing solution after a short softening time (about 2 to 5 minutes).

Example 3

| | Parts by weight (solids) |
|---|---|
| Acrylate dispersion (copolymer of 45% 2-ethylhexylacrylate, 45% butylacrylate, 3% vinylacetate and 7% acrylic acid, cross-linked with zinc acetate) | 30 |
| Acrylate dispersion (copolymer of 45% 2-ethylhexylacrylate, 45% butylacrylate, 3% vinylacetate and 7% acrylic acid, uncross-linked) | 20 |
| Polyvinylmethylether (K value about 40 "Lutonal M 40", BASF) | 20 |
| Sodium ammonium salt of a copolymer of acrylic and methacrylic acids ("Silkoplex 1", Rohm GmbH) | 10 |
| Monomeric plasticizer (phthalate based) ("Palatinol 0", BASF) | 10 |
| Non-ionic emulsifier (nonylphenolpolyglycolether) ("Arkopal N-110", Farbwerke Noechst) | 10 |

Example 4

| | Parts by weight (solids) |
|---|---|
| Acrylate dispersion (copolymer of 80% 2-ethylhexylacrylate, 8% butylacrylate, 5% methacrylic acid methyl ester, 5% vinylacetate, 2% acrylic acid cross-linked with zinc acetate) | 30 |
| Acrylate dispersion (copolymer of 80% 2-ethylhexylacrylate, 8% butylacrylate, 5% methacrylic acid methyl ester, 5% vinylacetate, 2% acrylic acid, uncross-linked) | 20 |
| Polyvinylmethylether (K value about 40 "Lutonal M40", BASF) | 20 |
| Sodium ammonium salt of a copolymer of acrylic and methacrylic acid ("Silkoplex 1", Rohm GmbH) | 10 |
| Monomeric plasticizer (dimethylglycolphthalate) | 10 |
| Non-ionic emulsifier (aromatic polyglycolether) ("Emulvin-W", Farbenfbk. Bayer AG) | 10 |

Example 5

| | Parts by weight (solids) |
|---|---|
| Acrylate dispersion (copolymer of 45% 2-ethylhexylacrylate, 45% butylacrylate, 3% vinylacetate and 7% acrylic acid, cross-linked with zinc acetate) | 30 |
| Polyvinylisobutylether dispersion (about 55% by weight aqueous dispersion, viscosity of 25° C:800 to 2500 cP (measured on Epprecht-viscometer type STV, CIII) ("Lutonal I 60 D", BASF) | 20 |
| Polyvinylmethylether (K value about 40) ("Lutonal M40", BASF) | 10 |
| Sodium ammonium salt of a copolymer of acrylic and methacrylic acid ("Silkoplex 1", Rohm and GmbH) | 10 |
| Monomeric plasticizer (phthalic acid based) ("Palatinol O", BASF) | 10 |
| Non-ionic emulsifier (nonylphenolpolyglycolether) ("Arkopal N - 110", Farbwerke Hoechst) | 10 |
| Antioxidant (dioxydiphenylmethane derivative) (aging protection agent "ZKF", Farbenfabriken Bayer AG) | 1 |

Example 6

| | Parts by weight (solids) |
|---|---|
| Polyvinylisobutylether dispersion (about 55% aqueous dispersion, viscosity at 25° C:800 to 2500 cP (measured in Epprecht-viscosimeter type STV, C III) ("Lutonal I 60 D", BASF) | 29 |
| Polyvinylisobutylether dispersion (about 55% aqueous dispersion, viscosity at 25° C:1500 to 2500 cP (measured in Epprecht-viscosimeter type STV, CIII) ("Lutonal I 65 D", BASF) | 20 |
| Polyvinylmethylether (K value about 40) ("Lutonal M 40", BASF) | 20 |
| Sodium ammonium salt of a copolymer of acrylic and methacrylic acids ("Silkoplex 1", Rohm GmbH) | 10 |
| Monomeric plasticizer (dimethylglycolphthalate) | 10 |
| Non-ionic emulsifier (aromatic polyglycolether) ("Emulvin-W", Farbenfabriken Bayer AG) | 10 |
| Antioxidant (dioxydiphenylmethane derivative) (aging protection agent "ZKF", Farbenfabriken Bayer AG) | 1 |

The pressure sensitive adhesive compositions of Examples 3, 4, 5 and 6 also show the same advantageous combination of valuable properties (good quick stick, exceptionally long term adherence to surfaces of various types, resistance to cold flow and aging, easy removal with water and aqueous preparations) as the compositions described in Examples 1 and 2. They can be used for the same purposes are described therein.

What we claim is:

1. An adhesive composition which comprises an aqueous mixture containing, based on 100 parts weight of the total solids,
   a. 25 to 35 parts by weight of an acrylic acid ester copolymer in dispersed form, said copolymer being cross-linked through its carboxyl groups and containing from 80 to 90% by weight of an acrylic acid ester of an alcohol having 4–12 carbon atoms, and from 10 to 20% by weight of a compound selected from the group consisting of acrylic acid, methacrylic acid, acrylonitrile, vinyl acetate, 2-ethyl hexyl maleinate, diethyl maleinate and mixtures thereof;

10 to 20 parts by weight of an uncross-linked acrylic acid ester copolymer in dispersed form, said copolymer contains from 80 to 90% by weight of an acrylic acid ester having in its alcohol residue 4–12 carbon atoms, and from 10 to 20% by weight of a compound selected from the group consisting of acrylic acid, methacrylic acid, acrylonitrile, vinyl acetate, 2-ethyl hexyl maleinate, diethyl maleinate and mixtures thereof;

b. 10 to 20 parts by weight of polyvinylmethyl ether;

c. 10 to 20 parts by weight of an alkali metal and/or ammonium salt of polyacrylic acid, polymethacrylic acid or of a copolymer of acrylic and methacrylic acids;

d. 10 to 20 parts by weight of monomeric plasticizer, and e. 10 to 15 parts by weight of an emulsifying agent.

2. The composition of claim 1 in which the acrylic acis ester component (a) is replaced partially or entirely by at least one water insoluble polyvinyl ether in dispersed form.

3. The composition according to claim 2 wherein, in component (a), the polyvinyl ether is a polymer of vinylisobutyl ether and/or vinylethyl ether.

4. The composition according to claim 1 wherein the plasticizer is dioctyl phthalate or dimethyl glycol phthalate.

5. The composition according to claim 1 wherein the emulsifying agent is nonionic.

6. The composition according to claim 5 wherein the emulsifying agent is a fatty acid ester of a polyvalent alcohol, an ethoxylated phenol, a polyvinyl alcohol or a polyglycol ether.

7. The composition according to claim 5 wherein the emulsifier is an aromatic polyglycol ether or a nonyl phenol polyglycol ether.

* * * * *